United States Patent [19]

Faccia

[11] Patent Number: 5,294,064
[45] Date of Patent: Mar. 15, 1994

[54] MACHINE FOR PREPARING LITTERS FOR ANIMALS

[76] Inventor: Tiziano Faccia, Via Padova 102, 35026 Conselve (Province of Padova), Italy

[21] Appl. No.: 922,402

[22] Filed: Jul. 31, 1992

[30] Foreign Application Priority Data

Aug. 12, 1991 [IT] Italy .................. PD91A000145

[51] Int. Cl.[5] .................................................. B02L 19/00
[52] U.S. Cl. ................................. 241/101.7; 241/101.6
[58] Field of Search ............... 241/101.7, 101.1, 101.8, 241/101.6, 277; 366/603, 266

[56] References Cited

U.S. PATENT DOCUMENTS

| | | | |
|---|---|---|---|
| 3,916,605 | 11/1975 | Richards et al. | 241/101.7 X |
| 4,432,499 | 2/1984 | Henkensiefken et al. | 241/101.7 X |
| 5,082,188 | 1/1992 | Urich | 241/101.7 X |

FOREIGN PATENT DOCUMENTS

| | | |
|---|---|---|
| 3232905 | 3/1984 | Fed. Rep. of Germany . |
| 3928240 | 2/1991 | Fed. Rep. of Germany . |
| 2511997 | 3/1983 | France . |
| 9105460 | 5/1991 | PCT Int'l Appl. . |
| 633255 | 3/1949 | United Kingdom . |

*Primary Examiner*—Douglas D. Watts
*Attorney, Agent, or Firm*—Guido Modiano; Albert Josif; Daniel O'Byrne

[57] ABSTRACT

The machine for preparing litters for animals in the field of zootechny includes, on a self-propelled or towed wheeled chassis, a container which is provided with a scroll-like element for shredding and mixing fibrous products, for example straw and/or hay and/or equivalent products, and bladed rotating elements, suitable for spreading the fibrous products arriving from a discharge opening of the container, are associated with the machine.

13 Claims, 4 Drawing Sheets

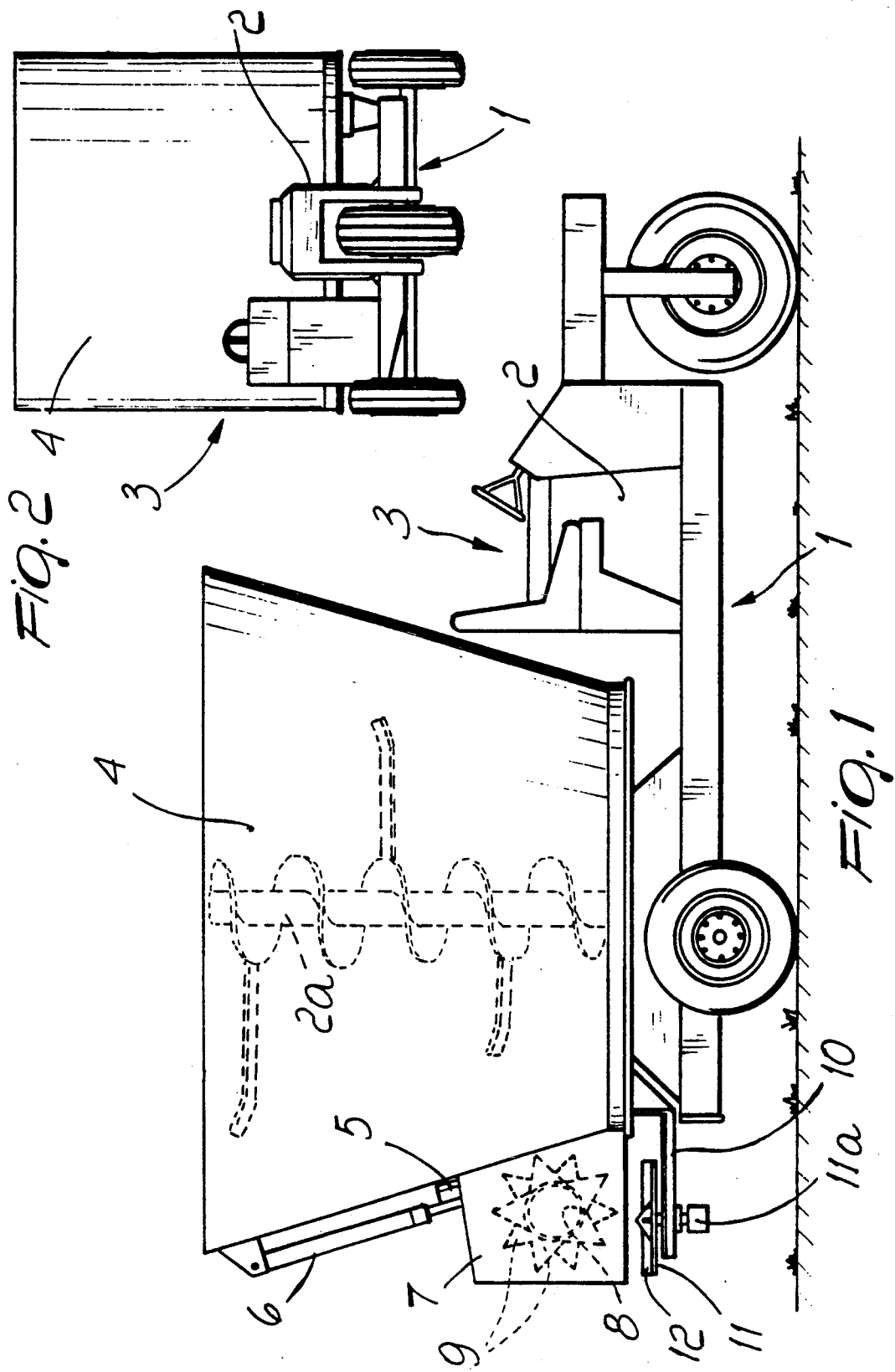

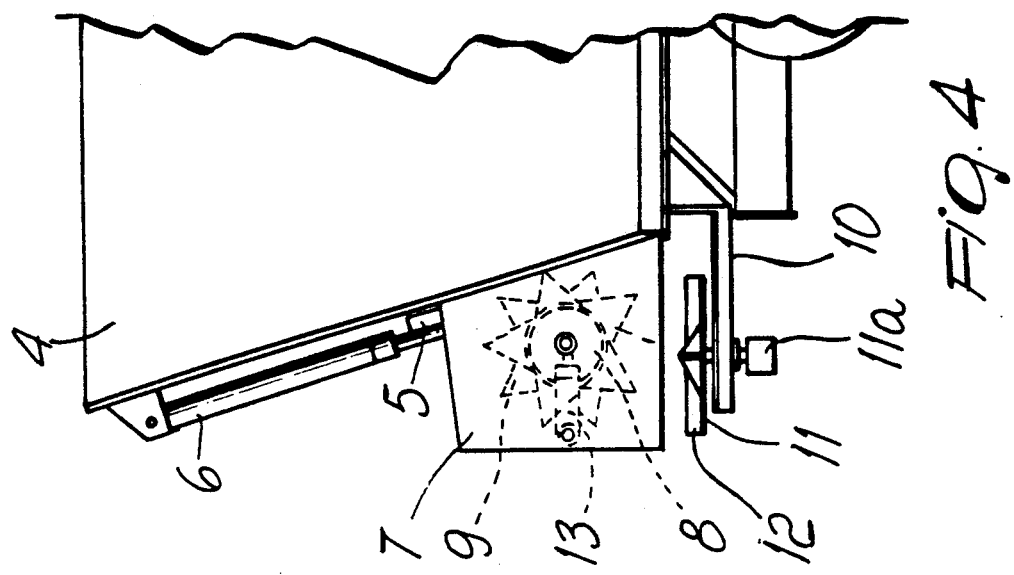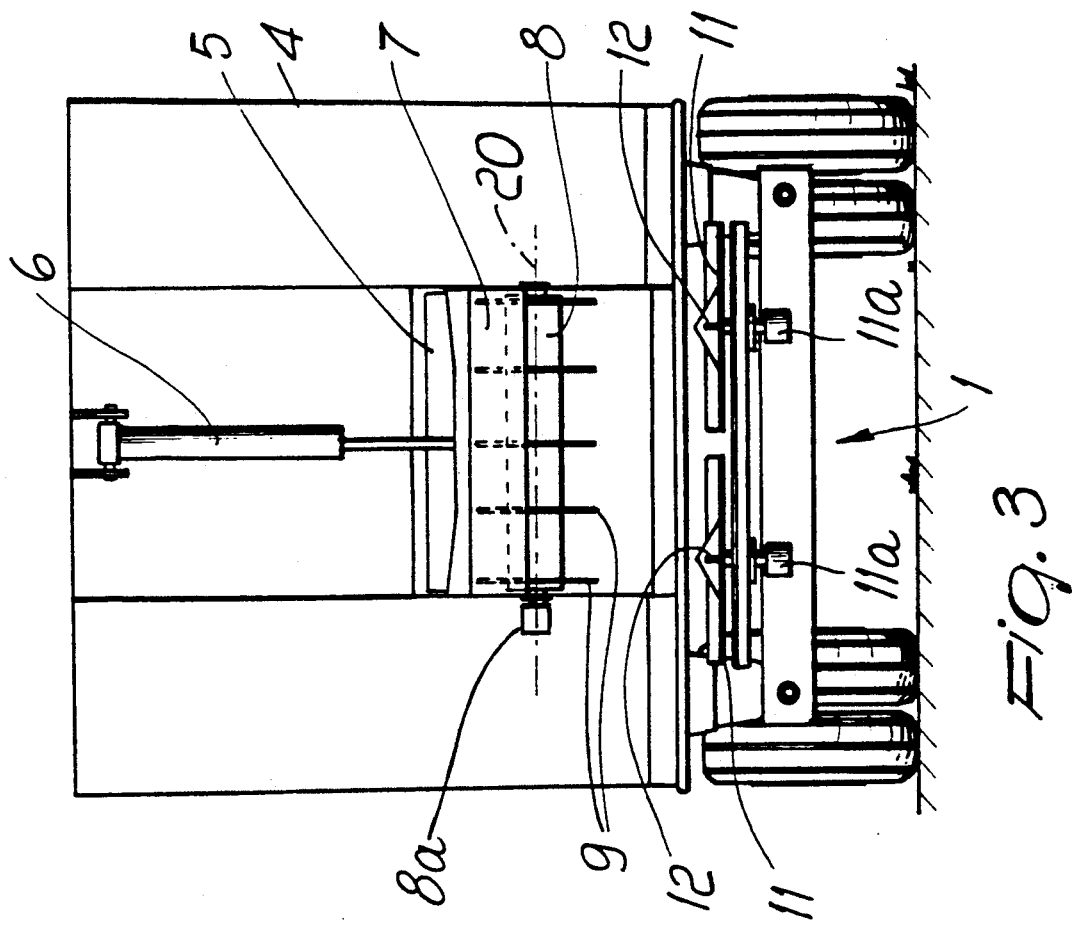

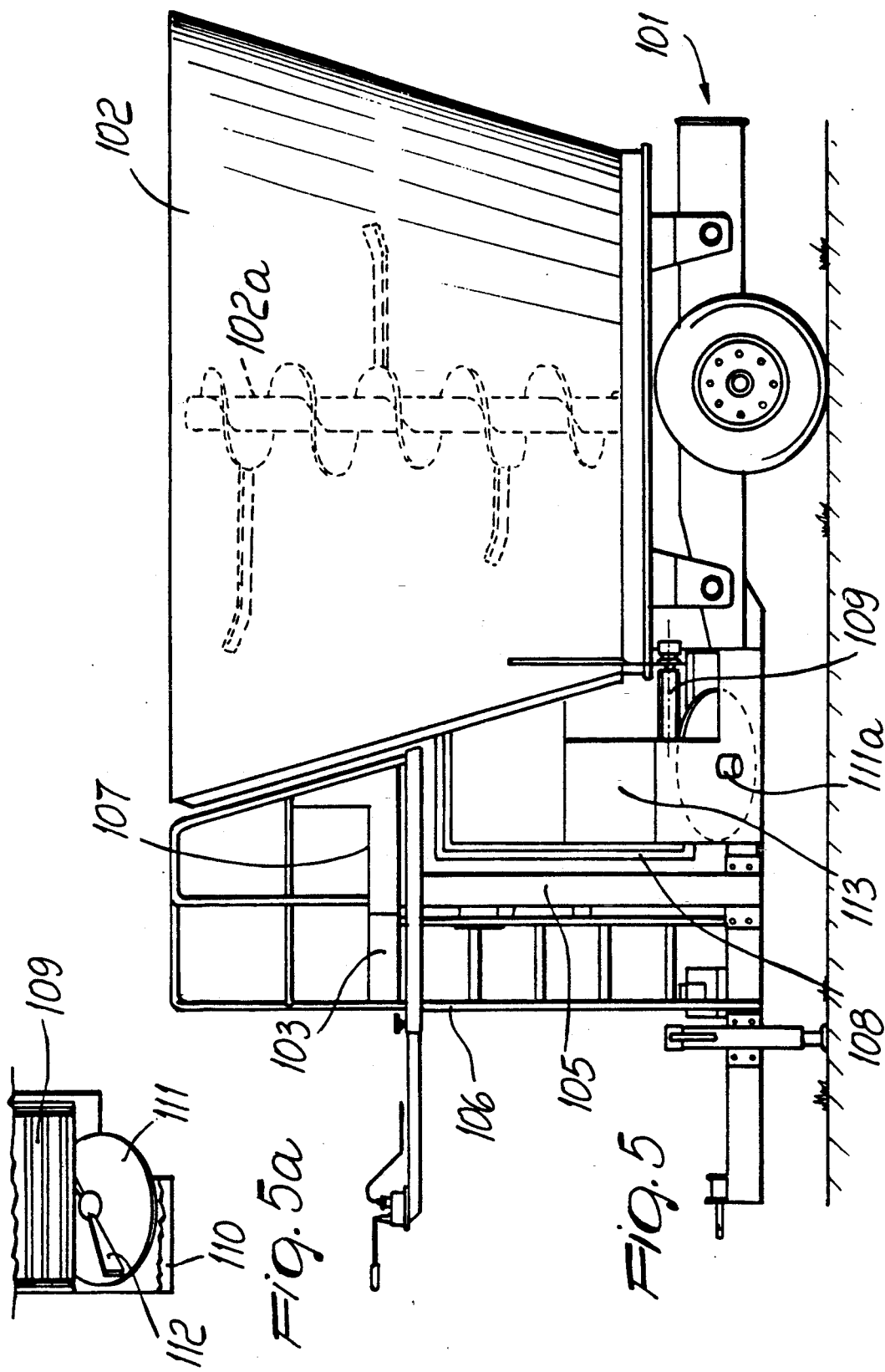

MACHINE FOR PREPARING LITTERS FOR ANIMALS

BACKGROUND OF THE INVENTION

The present invention relates to a machine for preparing litters for animals.

It is known that beds made of hay and/or straw are provided for animals in zootechnical farms.

Said beds are currently made in a substantially manual manner or by fitting, in some cases, trucks for mixing fibrous products with blowers which are suitable to aspirate the shredded products from the inside of the container and blow them outward through an orientatable tube.

However, these blowers have proved themselves suitable to only partially solve the problem constituted by the need to provide said litters.

SUMMARY OF THE INVENTION

The aim of the present invention is to provide a machine which can produce animal litters automatically.

A consequent primary object is to provide a machine which can be manufactured with the additional function of preparing fodder for animals.

Another object is to provide a machine which can produce uniform and consistent beds.

Not least object is to quicken the operation for producing litters in animal farms.

This aim, these objects and others which will become apparent hereinafter are achieved by a machine for preparing litters for animals, which comprises, on a self-propelled or towed wheeled chassis, a container provided with means for shredding and mixing fibrous products, such as straw and/or hay and/or equivalent products, associated with bladed rotating means which are suitable to spread the fibrous products which arrive from a discharge opening thereof.

BRIEF DESCRIPTION OF THE DRAWINGS

Further characteristics and advantages of the invention will become apparent from the detailed description of some embodiments thereof, illustrated only by way of nonlimitative example in the accompanying drawings, wherein:

FIG. 1 is a side elevation view of a self-propelled machine for preparing animal litters;

FIG. 2 is a front elevation view of the machine of FIG. 1;

FIG. 3 is a rear elevation view of the machine of FIG. 1;

FIG. 4 is a lateral detail view of a variation of the machine of FIG. 1;

FIG. 5 is a side elevation view of a towed machine for preparing litters and fodder for animals;

FIG. 5a is a top detail view of the machine of FIG. 5;

DESCRIPTION OF THE PREFERRED EMBODIMENTS

Figure 6:
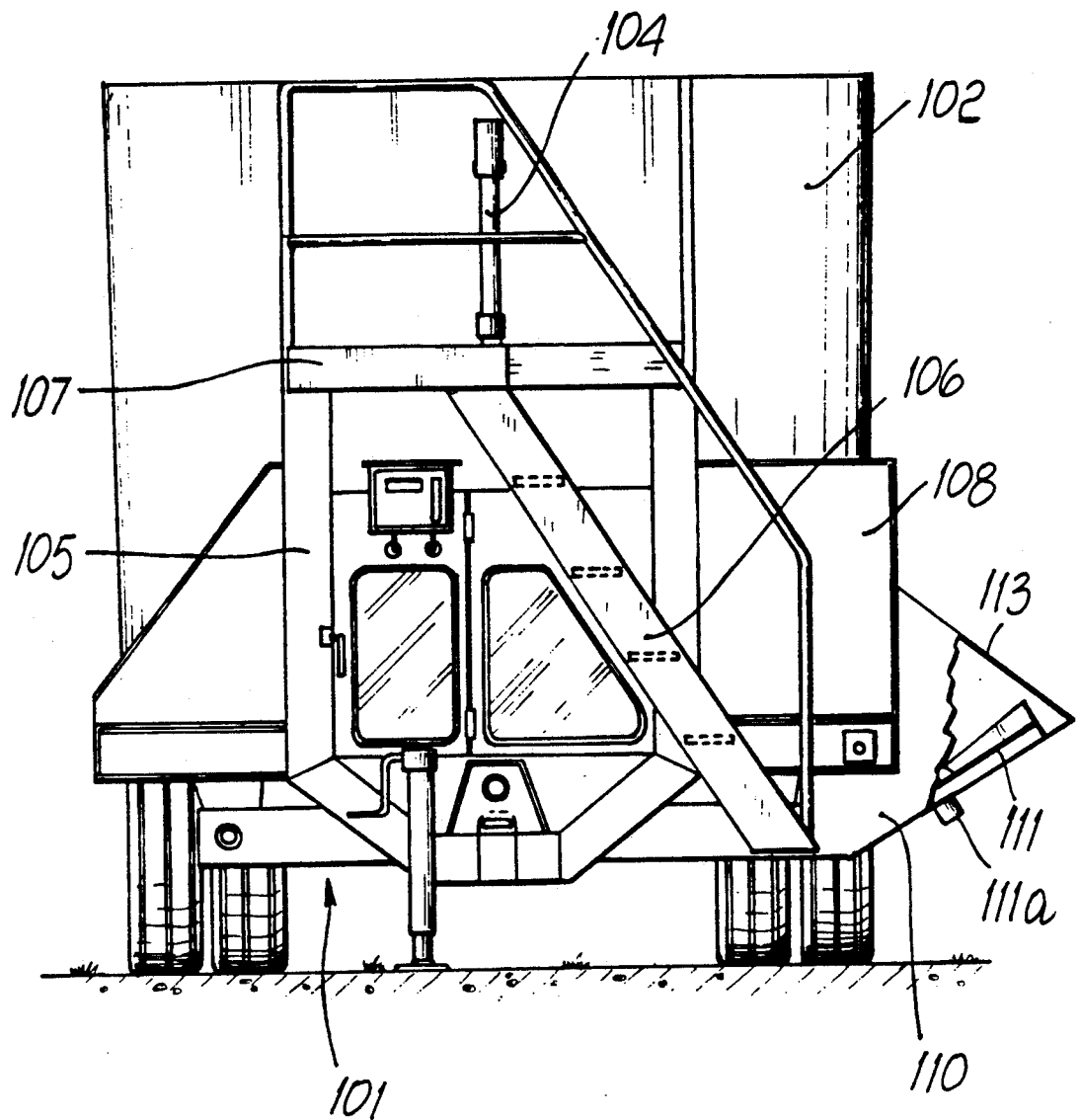
FIG. 6 is a front elevation view of the machine of FIG. 5.

With reference to the above FIGS. 1 to 4, a self-propelled machine for preparing litters for animals (which can in any case also be configured as a combined machine for preparing litters and fodder) comprises a wheeled chassis 1 on which a drive unit 2 is arranged at the front and on which a driver's seat 3 is located to the side of said drive unit.

A container 4, shaped substantially like an inverted truncated cone, is arranged to the rear on the chassis 1; said container is open at the top and is internally provided with a conventional scroll-like element with cutters 2a of a per se known type which is suitable to shred and mix normal or large bales of fibrous products such as straw and/or hay and/or equivalent products.

A discharge door 5 is slidingly coupled at the rear, on the lower region of the wall of the container 4, at a corresponding opening, and is actuated so that it moves substantially vertically by a hydraulic piston 6.

The opening of the container 4 leads into a box-like structure 7 between whose side walls a roller 8 is rotatably coupled; said roller has a horizontal axis 20, is motorized by means of a motor 8a and supports rigidly coupled radial wings 9 which are conveniently triangular and which are arranged in co-planar groups.

A plate-like base 10 is arranged below said motorized roller 8, is fixed to the chassis 1 or to the base of the machine, and rotatably supports a pair of disk-like elements 11 which are motorized by means of motors 11a and which are arranged side by side and so that their axes are vertical; each disk-like element supports radial blades 12 on its upper face.

In practice, after introducing a normal or large bale of straw into the container 4 from above and after shredding it, the door 5 is opened and the roller 8 is actuated so as to rotate, removing the material from the inside of the container 4 and discharging it onto the disk-like elements 11.

The actuation of the rotation of said disk-like elements causes the spreading of the fibrous products and the progressive forming of the litter.

With particular reference now to the above FIG. 4, a variation has a motorized roller 8 which is rotatably coupled not to the walls of the box-like structure but to the stems of a pair of pistons 13 which are conveniently fixed to said structure 7 with their bodies.

Said pistons 13 are suitable to move the roller 8 horizontally so that it can, when required, be partially inserted in the container 4 in order to facilitate the removal of the shredded fibrous products.

With reference now to FIGS. 5, 5a and 6 described above, a second possible embodiment of a machine for preparing litters for animals comprises a wheeled chassis 101, of the towed type, on which, as in the preceding case, a container 102 with a conventional internal element 102a for shredding and mixing fibrous products is mounted.

At the front, said container 102 has, on its wall, in a downward region, a discharge outlet, not visible in the figures, which is conveniently provided with a door which can slide vertically and of which only the hydraulic actuation piston 104 is visible.

Also in the front region, a supporting structure 105 is mounted on the chassis 101 and supports a ladder 106 with an inspection platform 107.

A frame 108 is instead rigidly coupled to the container 102, which is conveniently mounted on load cells, and supports a conveyor belt 109 which is suitable to distribute the fibrous products discharged through the outlet of the container 102.

Said sliding belt 10 is conveniently bidirectional and a supporting structure 110 for a rotating disk-like element 111 is fixed to the chassis 108 in a downward position at one of its discharge ends; said disk-like element is conveniently motorized by means of a motor 111a and it is conveniently provided with radial blades 112 arranged on its upper face.

Said disk-like element 111 is inclined with respect to the horizontal so that it can spread upwardly the product which falls onto it from the conveyor belt 109, whose discharge region is conveniently limited by a partition 113 so as to direct the product at a radial region of the disk-like element 111.

At this point it should be noted that this type of machine can be used for the double function of preparing and distributing fodder for animals and for preparing litters.

In both of the described embodiments, the machine has achieved the intended aim and objects of the present invention.

It is in fact capable of considerably facilitating the work of operators by providing, in an automatic, uniform and constant manner, litters for animals.

The invention thus conceived is susceptible to numerous modifications and variations, all of which are within the scope of the inventive concept.

Furthermore, all the details may be replaced with other technically equivalent elements.

In practice, the materials employed, so long as they are compatible with the contingent use, as well as the dimensions, may be any according to the requirements.

I claim:

1. Machine for preparing litters for animals comprising:
    a container
    a wheeled chassis supporting said container, said wheeled chassis being self-propelled or towed,
    means for shredding and mixing fibrous products, such as straw and/or hay;
    a discharge opening provided in said container;
    bladed rotating means for spreading fibrous products arriving from said discharge opening, and;
    a downwardly open box-like structure located at said discharge opening;
    wherein said means for removing and discharging fibrous products comprise;
        at least one motorized roller having a horizontal axis, said motorized roller being coupled to said box-like structure and arranged in front of said discharge opening,
        radial wings provided on said roller, and;
        piston means connected to said motorized roller for moving said roller horizontally to partially enter said container through said discharge opening.

2. Machine according to claim 1, further comprising;
    a supporting structure fixed to said chassis and/or to said container and supporting said bladed rotating means, and
    wherein said bladed rotating means comprise;
        at least one motorized disk-like element having an upper face and arranged substantially below said discharge opening, and;
        radial blades provided on said upper face of said disk-like element;
    wherein said at least one disk-like element is inclined with respect to a horizontal plane for upwardly spreading fibrous products discharged thereon.

3. A machine for preparing litters for animals comprising, in combination, a truck for shredding and mixing fibrous products and a discharge unit, said truck comprising;
    a container
    a wheeled chassis supporting said container;
    means for shredding and mixing fibrous products in said container, and;
    a discharge opening provided in said container;
    said discharge unit comprising;
        housing means connected to said container and communicating with said discharge opening;
        blade carrying rotary distribution means connected to said machine for outwardly dispersing shredded fibrous products from said housing means, and
        means for conveying shredded fibrous products from said container, through said discharge opening into said housing means and onto said blade carrying rotary distribution means.

4. A machine according to claim 3, further comprising;
    a discharge door slideably connected to said container at said discharge opening, and;
    means for moving said discharge door for closing and opening said discharge opening.

5. A machine according to claim 4, wherein said discharge door is slideable in a substantially vertical direction, and wherein said means for moving said discharge door comprise a hydraulic piston.

6. A machine according to claim 3, wherein said housing means comprise a box-like structure having side walls, and
    wherein said means for conveying shredded fibrous products from said container, through said discharge opening into said housing means and onto said blade carrying rotary distribution means comprise;
        a motorized roller having a substantially horizontal axis mounted rotatably between said side walls of said box-like structure, and;
        radial wing means connected to said roller.

7. A machine according to claim 3, wherein said means for conveying shredded fibrous products from said container, through said discharge opening into said housing means and onto said blade carrying rotary distribution means comprise;
    a pair of pistons fixed to said truck and having stems, and;
    a motorized roller having a substantially horizontal axis mounted rotatably between said stems of said pair of pistons;
said pistons being activatable for partially inserting said roller in said container through said discharge opening.

8. A machine according to claim 3, wherein said blade carrying rotary distribution means comprise;
    a plate-like base fixed to said chassis;
    a plurality of substantially horizontal disk-like elements rotatably connected to said plate-like base below said means for conveying shredded fibrous products from said container;
    motor means connected to said plate-like base for rotating said disk-like elements with respect to said plate-like base;
    an upper face defined by each of said disk-like elements, and;
    a plurality of radial blades connected to said upper face of each of said disk-like elements.

9. A machine for preparing litters for animals comprising, in combination, a truck for shredding and mixing fibrous products and a discharge unit, said truck comprising;
    a container
    a wheeled chassis supporting said container;

means for shredding and mixing fibrous products in said container, and;

a discharge opening provided in said container; said discharge unit comprising;

housing means connected to said container and communicating with said discharge opening;

blade carrying rotary distribution means connected to said machine for outwardly dispersing shredded fibrous products from said housing means, and means for conveying shredded fibrous products from said container, through said discharge opening into said housing means and onto said blade carrying rotary distribution means, wherein said blade carrying rotary distribution means comprise;

a plate-like base fixed below said means for conveying shredded fibrous products from said container;

at least two disk-like elements rotatably connected to said plate-like base;

motor means connected to said plate-like base for rotating said disk-like elements with respect to said plate-like base;

an upper face defined by each of said disk-like elements, and;

a plurality of radial blades connected to said upper face of each of said disk-like elements.

10. A machine according to claim 9, further comprising;

a discharge door slideably connected to said container at said discharge opening, and;

means for moving said discharge door for closing and opening said discharge opening.

11. A machine according to claim 10, wherein said discharge door is slideable in a substantially vertical direction, and wherein said means for moving said discharge door comprise a hydraulic piston.

12. A machine according to claim 9, wherein said housing means comprise a box-like structure having side walls, and wherein said means for conveying shredded fibrous products from said container, through said discharge opening into said housing means and onto said blade carrying rotary distribution means comprise;

a motorized roller having a substantially horizontal axis mounted rotatably between said side walls of said box-like structure, and;

radial wing means connected to said roller.

13. A machine according to claim 9, wherein said means for conveying shredded fibrous products from said container, through said discharge opening into said housing means and onto said blade carrying rotary distribution means comprise;

a pair of pistons fixed to said truck and having stems, and;

a motorized roller having a substantially horizontal axis mounted rotatably between said stems of said pair of pistons;

said pistons being activatable for partially inserting said roller in said container through said discharge opening.

* * * * *